US00RE39852E

(19) United States
(12) Reissued Patent
Uitenbroek

(10) Patent Number: US RE39,852 E
(45) Date of Reissued Patent: Sep. 25, 2007

(54) CHARGE CONTROL DEVICE FOR AND METHOD FOR CONTROLLING THE FUNCTIONING OF A RECIPROCATING INTERNAL COMBUSTION ENGINE

(75) Inventor: Paul Uitenbroek, Kohlscheid (DE)

(73) Assignee: Nonox B.V. (NL)

(21) Appl. No.: 10/810,548
(22) PCT Filed: Jul. 5, 1999

(86) PCT No.: PCT/EP99/04660

§ 371 (c)(1),
(2), (4) Date: Feb. 8, 2001

(87) PCT Pub. No.: WO00/03131

PCT Pub. Date: Jan. 20, 2000

Related U.S. Patent Documents

Reissue of:
(64) Patent No.: 6,360,719
Issued: Mar. 26, 2002
Appl. No.: 09/743,403
Filed: Feb. 8, 2001

(30) Foreign Application Priority Data

Jul. 8, 1998 (DE) ..... 198 30 575

(51) Int. Cl.
*F02D 9/14* (2006.01)
*F02D 9/16* (2006.01)

(52) U.S. Cl. ..... 123/399; 123/336; 123/337; 123/80 R; 123/190.1

(58) Field of Classification Search ..... 123/80 R, 123/190.1, 308, 336, 337, 399, 432
See application file for complete search history.

(56) References Cited

U.S. PATENT DOCUMENTS 4,484,556 A 11/1984 Okimoto et al.
4,738,233 A * 4/1988 Hitomi et al. ..... 123/403
4,802,452 A * 2/1989 Kanesaka ..... 123/403
4,892,071 A * 1/1990 Asayama ..... 123/336
4,913,114 A 4/1990 Kalippke et al.
4,932,378 A * 6/1990 Hitomi et al. ..... 123/308
5,105,784 A 4/1992 Kalippke et al.
5,205,245 A 4/1993 Flack et al.
5,255,648 A 10/1993 Hokazono et al.
5,325,829 A * 7/1994 Iwasiuk ..... 123/336
5,477,840 A 12/1995 Neumann
5,718,198 A * 2/1998 Adamisin et al. ..... 123/308
5,778,851 A * 7/1998 Schellhase et al. ..... 123/337
5,803,045 A * 9/1998 Adamisin et al. ..... 123/336
5,867,986 A 2/1999 Buratti et al.
6,055,953 A 5/2000 Weickel et al.

FOREIGN PATENT DOCUMENTS

| | | |
|---|---|---|
| DE | 29 38 118 | 4/1981 |
| EP | 0 718 481 | 6/1996 |
| JP | 59-126031 | 11/1984 |

OTHER PUBLICATIONS

Walzer, Peter et al., "Variable Steuerzeiten und variable Verdichtung beirn Ottomotor", MTZ Motortechnishe Zeitschrift 47 (1986) 1, pp. 15–20.

* cited by examiner

*Primary Examiner*—Erick Solis
(74) *Attorney, Agent, or Firm*—Robert W Becker & Associates; Robert E Becker

(57) ABSTRACT

A charge control apparatus and a method for operating an reciprocating internal combustion engine are provided. The charge control apparatus includes a rotary disc valve disposed in the intake conduit upstream of the intake valve and connected to a motor and a control unit. The rotary disc valve is movable by the motor between a position in which the rotary disc valve closes the intake conduit and a position in which it permits flow along the intake conduit to the intake valve. The control unit controls the movement of the rotary disc valve in its closing position in the intake conduit such that the closing time point of the rotary disc valve is set increasingly ahead of the closing time point of the intake valve as a function of decreasing performance demands.

31 Claims, 9 Drawing Sheets

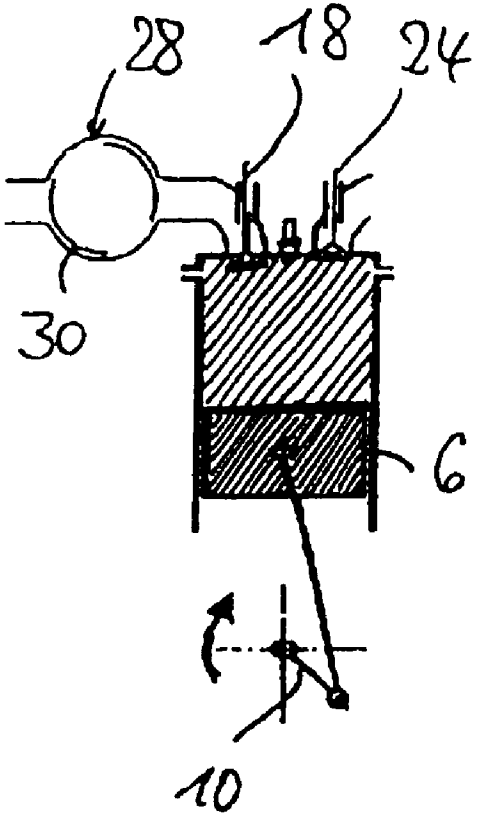
b)
Fig. 2
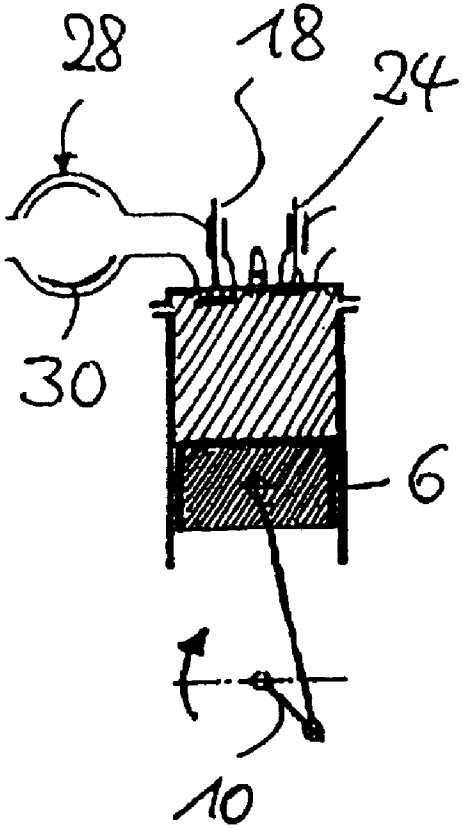
a)

b)

CHARGE CONTROL DEVICE FOR AND METHOD FOR CONTROLLING THE FUNCTIONING OF A RECIPROCATING INTERNAL COMBUSTION ENGINE

Matter enclosed in heavy brackets [ ] appears in the original patent but forms no part of this reissue specification; matter printed in italics indicates the additions made by reissue.

*Applicant claims foreign priority of DE 198 30 575.3 filed Jul 8, 1998 and PCT/EP99/04660 filed Jul. 5, 1999.*

BACKGROUND OF THE INVENTION

The invention relates to a charge control apparatus for controlling the operation of a reciprocating internal combustion engine, especially a gasoline engine. The invention also relates to a method for controlling the operation of a reciprocating internal combustion engine, especially a gasoline engine.

One of the reasons that reciprocating internal combustion engines, especially reciprocating internal combustion engines controlled via a throttle valve and operated as a four cycle engine, have an increasingly higher specific fuel usage in correspondence with decreasing loading—that is, fuel usage per given work unit—is attributable to the throttle loss. An increasing underpressure or vacuum is formed downstream of the throttle valve in the volume of the suction intake between the throttle valve and the intake valve in correspondence with an increasingly more frequently closed throttle valve and this increasing vacuum reduces during the period during which the intake valve is closed. The energy stored in this volume which is impacted by the vacuum is consequently lost for use otherwise as work energy. The vacuum created by the downward movement of the piston during the intake stroke causes a dissipative loading change side in the P-V (pressure-volume) diagram

SUMMARY OF THE INVENTION

The invention provides a solution to the challenge of providing a charge control apparatus for a reciprocating internal combustion engine, especially a gasoline engine, which is operable to effect an especially fuel saving operation of the reciprocating internal combustion engine. The invention further provides a solution to the challenge of providing a method for controlling the operation of a reciprocating internal combustion engine, especially a gasoline engine, such that an especially fuel saving and environmentally beneficial operation of the reciprocating internal combustion engine is possible.

With the help of the valve provided in accordance with the invention which is disposed in the intake channel and which is actuated by a dedicated electric motor, a charge control of an internal combustion engine in a throttle valve free manner is possible such that substantially all thermodynamically favorable charging controls can be achieved through the possible variations of the control of the [rotary disc] valve.

In accordance with another feature of the present invention, the efficiency of the combustion engine, particularly with respect to partial loading, is improved or, respectively, the associated fuel usage is reduced [by the features of claim 2].

[Claims 7–9 define a further embodiment of a valve.]

In accordance with another feature of the present invention, the invention can be advantageously used for motors with two intake valves.

In accordance with one aspect of the present invention, there is provided a method for controlling the operation of a reciprocating internal combustion engine. Through the special control of the [rotary disc] valve *disposed in the intake channel*, [it is achieved that the vacuum produced] *a reduced pressure can be generated* between the [rotary disc] *intake channel* valve and the intake valve in the [intake channel] *cylinder, which reduced pressure* creates a pressure wave which reduces the intake effort of the piston and thus contributes to [a particularly favorable fuel economizing operation] *reducing fuel consumption*.

In accordance with another aspect of the present invention, there is provided a method for controlling the operation of a reciprocating internal combustion engine which can be implemented as well with the features of motors for controlling the operation of two intake valves per cylinder. With the help of the targeted modulation of the fresh air or fresh combustion gas loading which flows through the intake openings, it is possible to create, in a weak load situation, a prescribed turbulence in the charge introduced into the cylinder or the combustion space of the type which is a prerequisite for a fuel lean and thermodynamically favorable complete combustion.

The invention is suitable for all types of valve controlled reciprocating internal combustion engines including two cycle engines, four cycle engines, Otto motors, diesel motors, and so forth.

FIG. 1 a conceptual view of a cylinder of a reciprocating internal combustion engine having a pre-actuated rotary disc valve, FIG. 2 a schematic view of the operation of the cylinder shown in FIG. 1 during various operational phases, FIG. 3 an exploded perspective view of a rotary disc valve, FIG. 4 a side view of a rotary disc valve operable with a cylinder having two intake valves, FIG. 5 a conceptual view of a rotary disc valve for understanding a charging process, FIG. 6 a series of work diagrams of various process paths of the combustion process, FIG. 7 a side view of an embodiment of a rotary disc valve with an integrated electric motor;

FIG. 8 a schematic view of the register charging device and

FIG. 9 a sectional view of an embodiment of a rotary disc valve.

Figure 1:
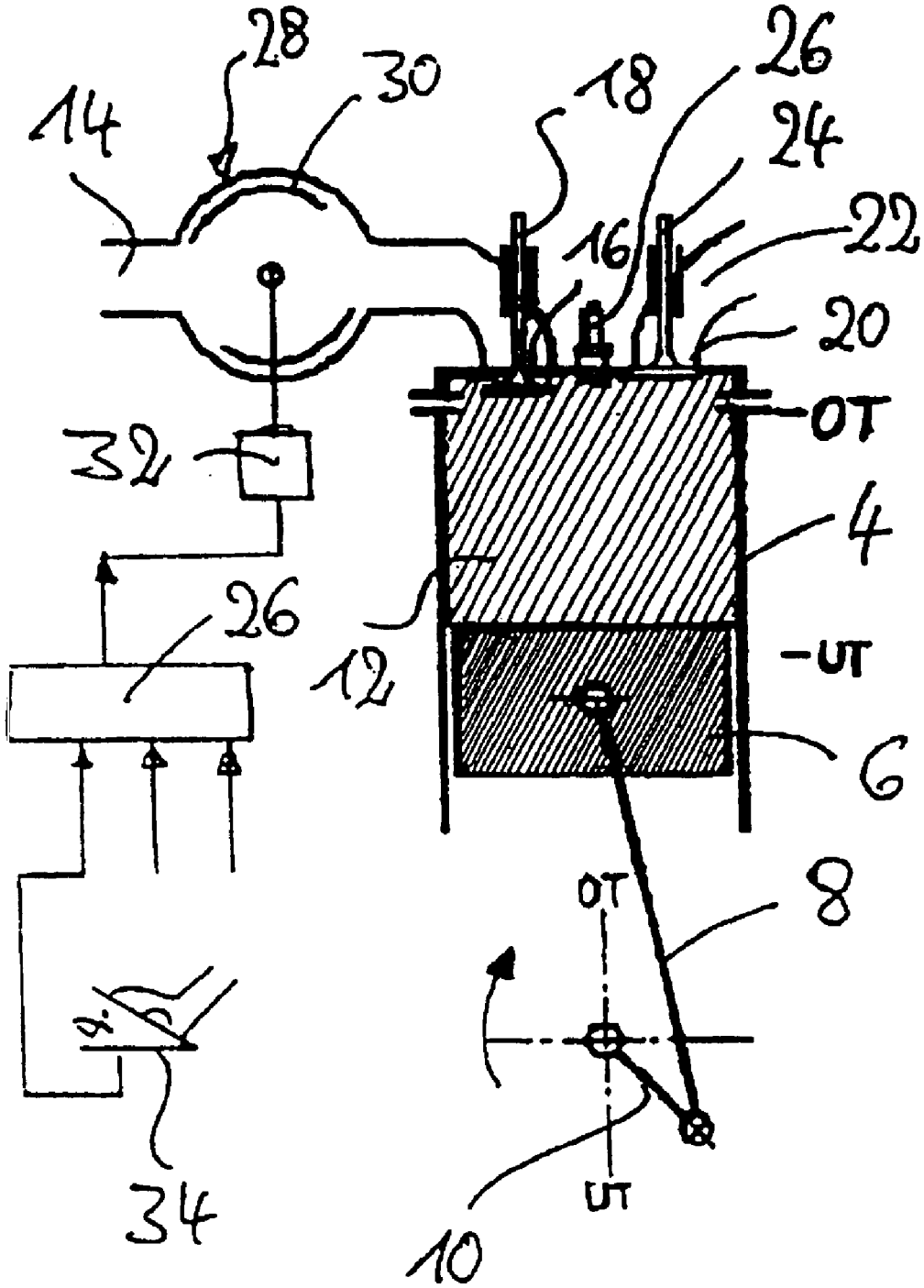
As seen in FIG. 1, an internal combustion engine and, especially, a gasoline powered, relatively slow (low revolutions per minute) commercial vehicle engine, includes a cylinder 4 in which a piston 6 is movable, the cylinder being coupled via a piston rod 8 to a crankshaft 10 for driving rotation thereof. The designated "UT" and "OT" designate, respectively, the lowermost travel position of the piston 8 and the uppermost travel position of the piston A fresh combustion charge into the combustion space or chamber 12 of the cylinder is introduced through a suction conduit 14, whereby an intake valve 18 opens and closes the intake opening 16 at which the suction conduit 14 is communicated with the cylinder 4. An outlet valve 24 opens and closes an outlet opening 20 with respect to an outlet conduit 22 communicated therewith.

The ignition of the charge introduced into the combustion space 12 is effected by a spark plug 26. The intake valve 18 and the outlet valve 24 are controlled in a conventional manner by one or more crankshafts, each of whose rotation is in lockstep one-to-one manner with the crankshaft 10 or rotated at a rotation other than a one-to-one rotation with the crankshaft.

A conventional device for supplying the combustion fuel (gas) to the fresh air such that a combustible fresh charge with a predetermined air to fuel mixtures is available in the suction conduit 14 is not illustrated.

As is conventional, a microprocessor and an associated control unit 26 having storage capability are provided to control the operation of the internal combustion engine.

The configuration of the internal combustion engine described thus far is conventional and is not described in further detail.

A rotary disc valve 28 is disposed upstream of the intake opening 16 at the shortest possible spacing therefrom, the rotary disc valve being configured as a rotation shaft 30 having two openings disposed oppositely one another and the rotary disc valve being operable to selectively communicate the branches of the suction conduit 14 separated from one another by the rotary disc valve or to selectively block communication between the two branches. An electric motor 32, which can be, for example, a step motor, is controlled by the control unit 26 to drivingly rotate the rotatable shaft 30. The control unit 26 includes several input jacks comprising thereamong an input jack for connection of the control unit with a drive pedal 34. Other input jacks can be connected with a shaft rotation sensor for sensing the rate of rotation or the rotation position of the crankshaft 10, or connected with a temperature sensor, and so fourth.

The internal combustion engine is preferably provided with a conventional combustion charging device such as, for example, an exhaust gas turbo charger or a mechanically drive charging device, such that a vacuum is present in the suction conduit 14 upstream of the rotary disc valve 28.

Figure 2:
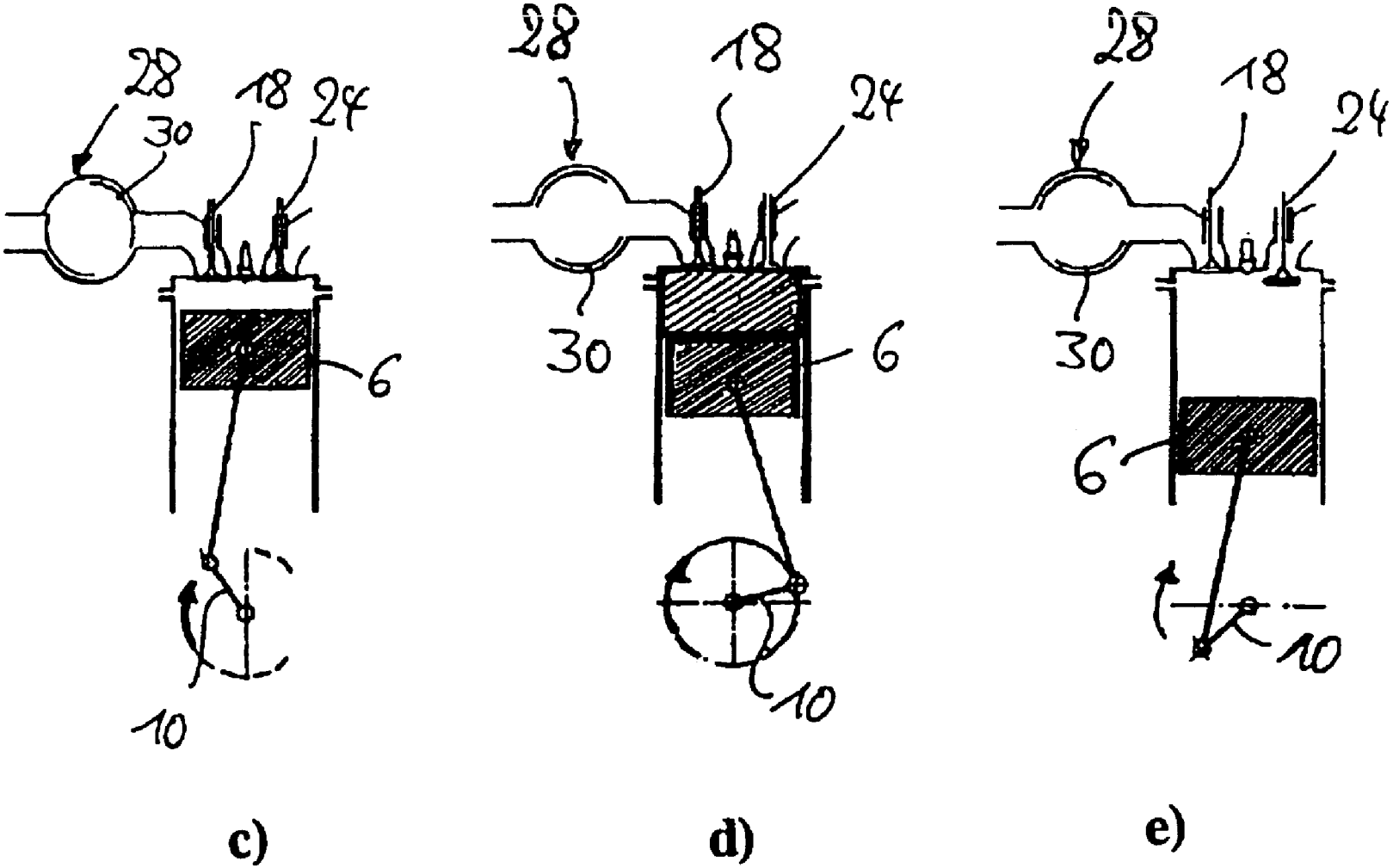

FIG. 2 shows various operational phases or steps of the herein described internal combustion engine. The intake valve 18 and the outlet valve 24 are controlled such that, for example, the intake valve opens 27.5° before OT and closes 38.5° after UT and such that the outer valve opens 57° before UT and closes 25° after OT.

FIG. 2a shows the operational condition of the intake suction during which the piston 6 has moved downwards until approximately 45° before UT while the intake valve 18 has been open and the rotary disc valve 28 has been in an open (branch communicating) disposition. During subsequent downward movement of the piston as seen in FIG. 2, the rotary disc valve 28 closes (i.e., is in a blocking disposition between the branches of the suction conduit 14), whereby a vacuum is produced in the space downstream of the rotary disc valve which reduces in a loss free manner in connection with movement of the piston beyond the lowermost dead center position until the intake valve 18 closes at 38.5° after UT.

As seen in FIG. 2c, the intake valve 18 remains closed during the subsequent compression stroke of the piston, whereby FIG. 2c shows the position at which the spark plug ignition occurs. During the working stroke of the piston as shown in FIG. 2d, the intake valve 18 and the outlet valve 24 are in their closed dispositions and the rotary disc valve 28 can thereafter be disposed in its open disposition. FIG. 2e shows the operation condition after a working stroke during which the outlet valve 24 is open for the beginning of the outlet cycle, the intake valve 18 is closed, and the rotary disc valve 28 is already in its open disposition. Once the piston has reached the position of 27.5° before OT, the intake valve 18 opens and the outlet valve 24 closes upon reaching the position 25° after OT; whereby the operational condition shown in FIG. 2a is again reached shortly thereafter.

Figure 3:
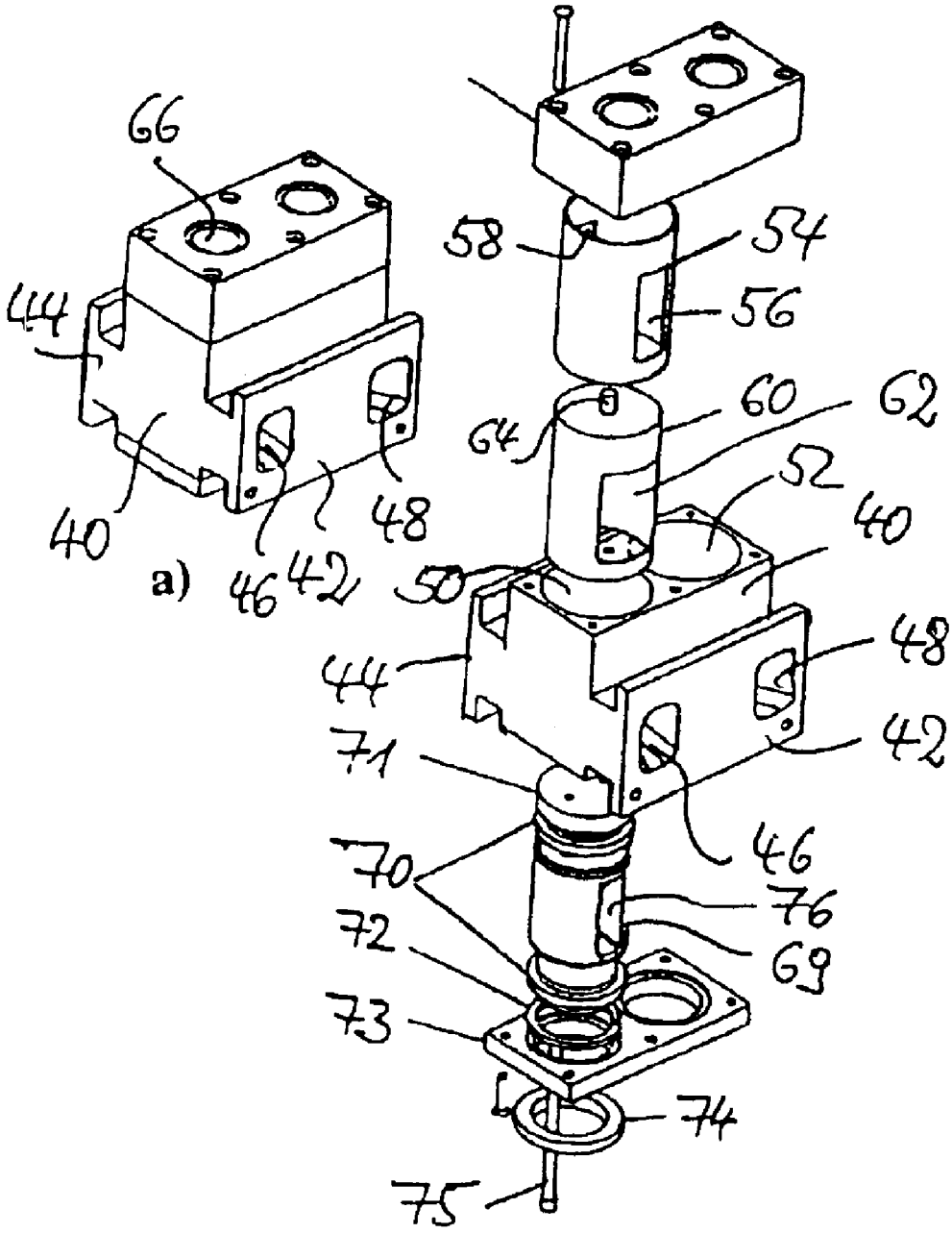

FIG. 3 is a perspective view showing a parts assembly of the rotary disc valve 28 or the rotary disc valves 28 (FIG. 1) couplable to a cylinder head (not illustrated), the parts assembly being shown in, respectively, assembled together condition in a) and exploded condition in b).

A housing 40 includes two connecting frames or flanges 42 and 44, one of the connecting frames being couplable to a cylinder head (not illustrated) of the internal combustion engine and the other connecting frame being couplable to the condition conduit (not illustrated). The housing 40 includes two through channels 46 and 48 configured in correspondence with connection openings formed in the cylinder head in which two suction channels independent of one another terminate, the suction channels leading to two inlet valves of a cylinder.

Throughbores 50 and 52 are located in the housing 40 oriented transversely to the through channels 46 and 48. A rotary disc valve as described hereinafter operates in each of the throughbores 50 and 52, whereby only the respective rotary disc valve in the throughbore 50 will be described.

A socket 54 compatibly configured with respect to the throughbore 50 is disposed therein and includes two openings 56 and 58 disposed opposite one another. The socket 54 is non-rotatively mounted in the housing 40. The openings 56 and 58 are aligned with the through channels 46 and have cross sections corresponding with those of the through channels.

A shaft rotary disc element 60 is disposed in the socket 54 and includes a pair of openings disposed oppositely one another of which only the opening 62 is visible. The shaft rotary disc element 60 is rotatable mounted within the socket 54 and includes a rod 64 on its top closed end which is received by a connection coupling 66 that is disposed in a cover piece 68 secured by bolts to the housing 40.

The shaft rotary disc element is guided and mounted by means of roller bearing 70 onto guide peg 69. The guide peg 69 has the further task of conducting the mixture flow or, respectively, preventing a fluttering or flow cut off in the valve. To this end, the guide peg 69 is secured on the base plate 73 and is disposed against rotation by means of the the washer 74 such that, in the disposition (by bolting) of the base plate 73 on the valve housing 40, the channel throughbores 76 of the guide peg 69 are exactly aligned with the channel throughbores 46, 48 in the housing 40. The parts assembly components 71, 72 and 75 (running discs and bolts) act to position the roller bearing 70 relative to the guide peg 69. The outer diameter of the fixedly mounted guide peg 69 is only slightly relatively smaller than the inner diameter of the rotating shaft rotary disc element 60 in order to prevent the formation of a dead space between the guide peg outer surface and the inner surface of the shaft rotary disc element 60. The free space between the two components (60 and 69) is thus selected so that an effective seal results therebetween while permitting disturbance free relative rotation therebetween.

The parts assembly components 54, 69, 60, and 62 form the rotary disc valve 28 shown in FIG. 1.

As can be seen in FIG. 3, the two through channels 46 and 48 can be controlled independently and separately of one another, via the rotary disc valves operating in the throughbores 50 and 52, by respective dedicated step motors, whereby, for example during reduced demand (small actuation of the drive pedal 34), an inlet channel of the cylinder remains completely closed such that the charge is delivered to the cylinder in correspondence with the configuration of the inlet channel as a swirl flow (axis of the swirl parallel to the direction of movement of the piston) or as a tumble flow (axis perpendicular to the direction of movement of the piston). As the demand increases, the two rotary disc valves are controlled such that the charges delivered through the two inlet channels are increasingly similar, whereby the swirl information in the cylinder or the combustion space can be accommodated to that of an optimal combustion velocity/combustion operation of the motor. In this manner, thermodynamic conditions for an effective combustion can be achieved in connection with partial charging without incurring a reduction in performance in connection with full charging of the cylinder.

Figure 4:
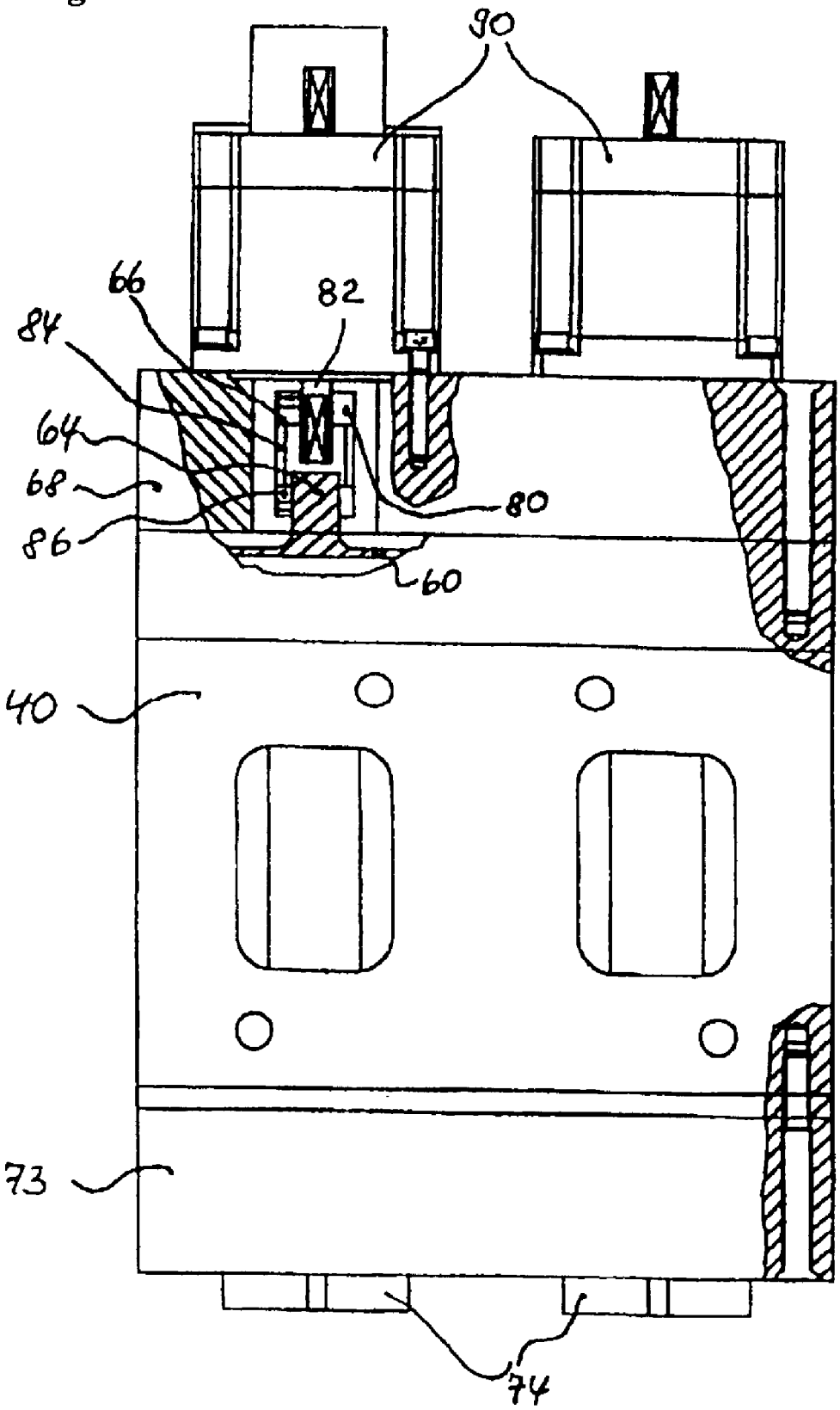

FIG. 4 shows a side view of the housing 40 in partial section. The housing 40, the housing cover piece 68, the rods 64 of the shaft rotary disc element 60 as well as the connection coupling 66 of the mounted step motor are clearly visible. Each connection coupling 66 includes a take along disc 80 which receives the motor shaft 82 in a non-rotating connection. The take along disc 80 is connected by a torque transmitting, flexible part 84 with another take along disc 86 which itself is connected to the rods 64 of the shaft rotary disc element 60 in a non-rotation or keyed manner. In this manner, a flexible and torsion stiff connection coupling is formed.

If the two step motors in their above-described configurations are to be differently controlled by the control unit 26 such that, for example, the shaft rotary disc element associated with the through channel 48 (FIG. 3) is operated to close the through channel 48 earlier than the through channel 46 is closed, more fresh charge will flow through the through channel 46 into the cylinder, thus leading, in association with a correspondingly configured intake channel and intake valve, to the formation of turbulence in the combustion space. The differential control of the step motors can be limited to the operational range of the motor wherein, in connection therewith, exceptional advantages can be achieved such as, for example, during weak demand. This control concept naturally comprises the possibility, in any event, to completely close an intake channel by means of the shaft rotary disc element, whereby a complete channel shut off is realized.

An extensive freedom in the selection of the opening and closing time points of the rotary disc valves relative to that of the intake valves arranged downstream of the rotary disc valves can be possible through control of the one or several rotary disc valves with the help of the electric motors 32 (FIG. 1) or, respectively, the step motors 90 (FIG. 4). It is possible, for example, through corresponding selection of the length of the suction conduit and the opening and closing time points of the rotary disc valve predetermined from such length selection, to use the vacuum which forms during the work phase shown in FIG. 2b between the rotary disc valve 28 and intake valve 18, such that a pressure wave, which has formed during the opening of the rotary disc valve while the intake valve was still closed, reaches the intake valve at a time just as this intake valve is opening whereby the intake effort required of the piston is lessened. Moreover, the extensive freedom in the selection of the opening and closing time points of the rotary disc valves permits specific influences to be taken into account in the selection of these opening and closing time points relative to the opening and closing time points of the intake valves downstream of the rotary disc valves, when a wave, formed by the corresponding vacuum and reflected at the open intake conduit end, arrives as a pressure wave at the end of an intake stroke at the open intake valve, whereby an after charging effect is achieved which increases the filing of the cylinder and reduces the requisite intake effort.

Figure 5:
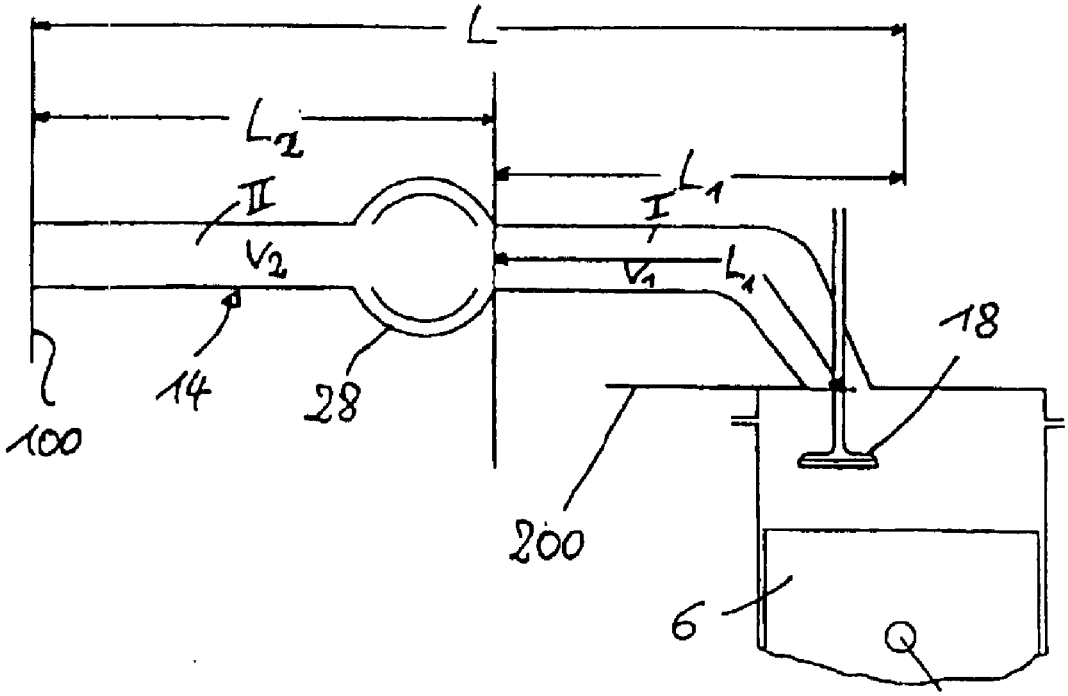

The above-described interrelationships are schematically shown in FIG. 5. The rotary disc valve 28 divides the suction conduit 14 having an overall length L and an overall volume V into two partial regions I and II having length and volume $L_1$, $V_1$ and $L_2$, $V_2$, respectively. The vacuum contained in the partial volume $V_1$ occurring during the closed condition of the rotary disc valve and the intake valve produces a wave, if the rotary disc valve is opened, which is reflected on the open end of the suction conduit 100 and the wave arrives as a pressure wave at the open intake valve 18 after traversing the overall length L. Position 200 characterizes the intake valve seat so that the effective conduit length L is defined by the position 100 and 200. This effect permits itself to be used in a wide range of motor operations as the required timing for releasing the wave formation and the reflection on the open conduit end can be ensured through the variable opening and closing time points of the rotary disc valve 4.

It is to be understood that the variability of the opening and closing time points of the one rotary disc valve or several rotary disc valves is such that the opening time point as well as the closing time point of the total opening interval of the intake valve can be covered.

For the reason of offering freedom of control, the opening phase and, in particular, the closing phase, of the step motor controlled rotary disc valve are substantially shorter than is the case with force controlled rotary disc valves (which are driven via the camshaft having fixed force translation characteristics). In this manner, the intake cycle of the phase or, respectively, the piston stroke, is shortened while the rotary disc valve cross section limits the throttle loss.

The arrangement of the invention can be installed on motors of the type which are charged to thereby provide advantages. The advantages of the inventive arrangement for charged motors is brought out in that the function of the exhaust limit, which is normally exercised by a waste gate valve (conducting exhaust gas past a turbine wheel) is taken over by prescribed control of the one rotary disc valve or the several rotary disc valves. In this manner, in the event of reaching and/or exceeding the maximum exhaust pressure, the closing time point of the rotary disc valve is set earlier. Thus, the cylinder charging and the amount of energy dictated thereby which is sent to the turbo charger is reduced. Through this process, the maximum achievable compression work of the compressor of the turbo charger is always ensured through the maximum release of the exhaust gas flow. No energy is lost through the waste gate valve. Through a prescribed early setting of the rotary disc valve, the desired cylinder charging amount at an optimal pressure difference between charging pressure and exhaust gas pressure of the cylinder is introduced. The above-noted optimal pressure difference causes, by the way, a positive work charging transition portion in the PV diagram. This process is known by the term Miller cycle. The inventive arrangement is an example of a specific realization of the Miller cycle.

Figure 6:
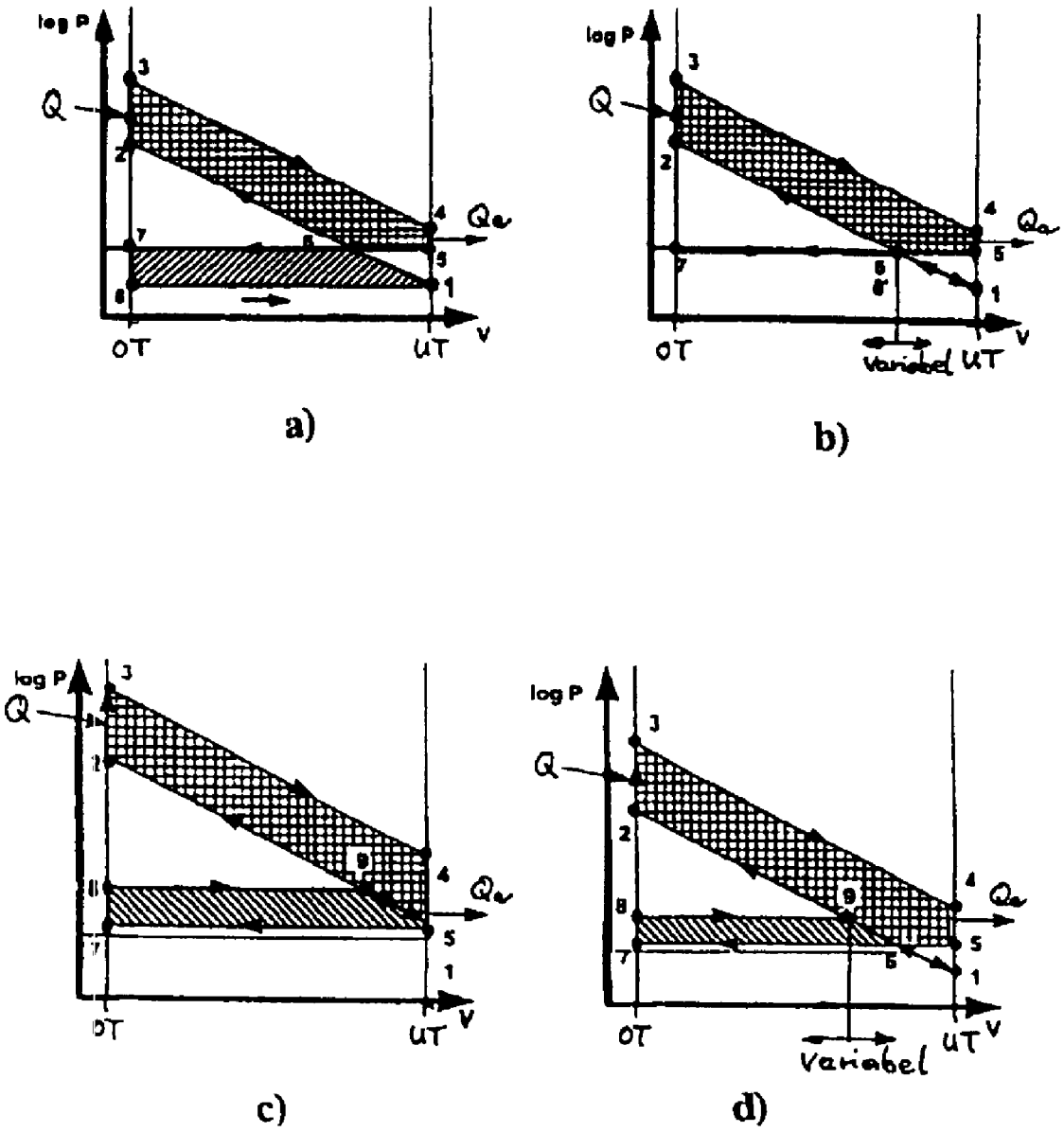

FIG. 6 shows a work diagram wherein the vertical axis indicates the logarithm of the pressure P in the work space of the cylinder and the horizontal axis indicates the volume V of the work space. OT and UT designate respectively the topmost and lowermost dead center points of the piston.

FIG. 6a shows the work diagram of a throttle valve controlled four cycle motor. The individual plots indicate:

1-2: polytropic compression

2;3: isochoric heat exchange with release of the heat amount Q.

3;4: polytropic expansion (work performance);

4;5: isochoric heat exchange (outlet is open);

5-6-7: isobar compression (outlet stroke);

7;8: intake opening

8-1: isobar intake

The stripped area indicates the lost pump work; the cross hatched area indicates the work performance.

FIG. 6b shows the work diagram during performance control via variable closing of the intake valve. The difference between this FIG. and FIG. 6a is that the exhaust stroke 5-7 and the intake stroke 7-6' occur at the same pressure level and the polytropic expansion 6-1' and the polytropic compression 1-6' follow at the same pressure, whereby the pump loss area is zero. The point 6 or, respectively, the point 6' (closing of the intake valve) is variable.

FIG. 6c shows the classic Miller cycle in which, as in FIGS. 6a and 6b, a heat amount Q exists at UT after the polytropic expansion from 3 to 4. The exhaust stroke 5 to 7 occurs with a relatively reduced exhaust gas counter pressure. The intake stroke from 8 to 9 occurs at a higher pressure produced by the charging system, whereby work is performed in the inclined stripped area in contrast to the process shown in FIG. 6a. Point 9 is the point at which the intake valve is closed.

FIG. 6d shows the work diagram for a Miller cycle by which the closing of the intake valve (Point 9) is variable, whereby the total work cycle can be further optimized.

Figure 7:
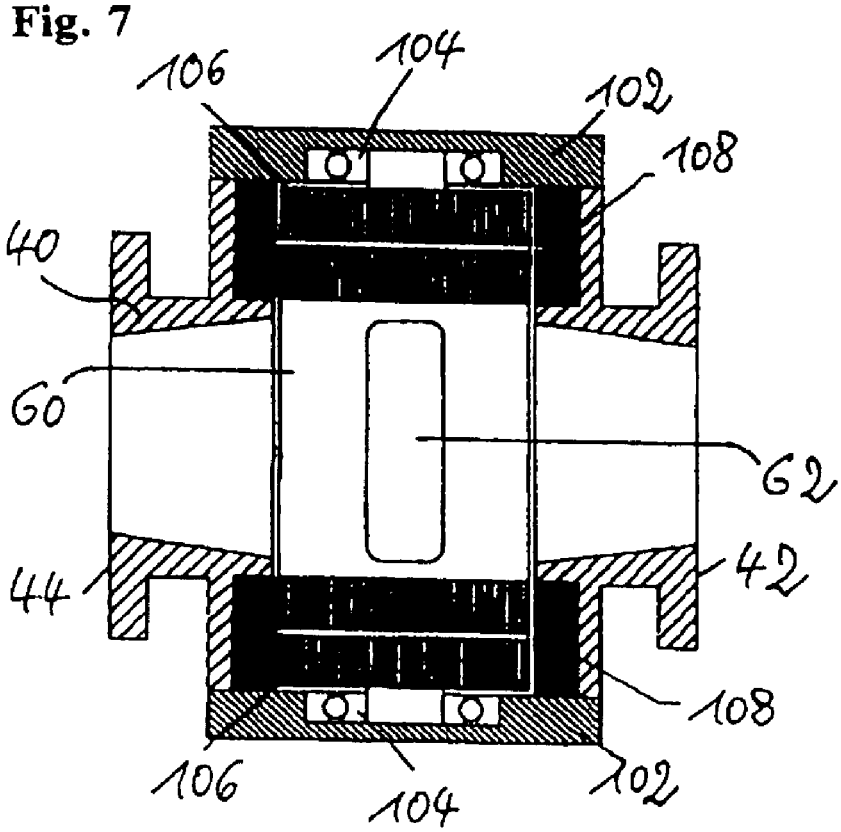

FIG. 7 shows a side view of a rotary disc valve which has been changed relative to the rotary disc valve shown in FIG. 3. Similarly functioning components are designated with the same reference numerals as those in FIG. 3. The shaft rotary disc element 60 having its opening 62 is rotatably mounted in the housing 40 which includes the connecting flanges 42 and 44. The housing 40 is closed at both ends by coverings 102. Roller bearings 104 are disposed within the coverings 102 and are the means by which the rotor or, respectively, the shaft rotary element 60 is rotatably mounted in the housing 40.

In contrast to the embodiment shown in FIGS. 3 and 4, the electric motor, which is a step motor, of the embodiment shown in FIG. 7 is integrated into the rotary disc valve in the form of a rotor winding 106 having alternating north and south poles rigidly connected with the rotor or, respectively, the shaft rotary disc element 60. Stator windings 108 of the electric motor are firmly connected to the housing 40 and the disposed in corresponding recesses of the housing 40.

The described arrangement forms an unusually compact rotary disc valve with an integrated step motor. The electrical connections for controlling the stator windings 108 by means of a control unit are not illustrated.

Figure 8:
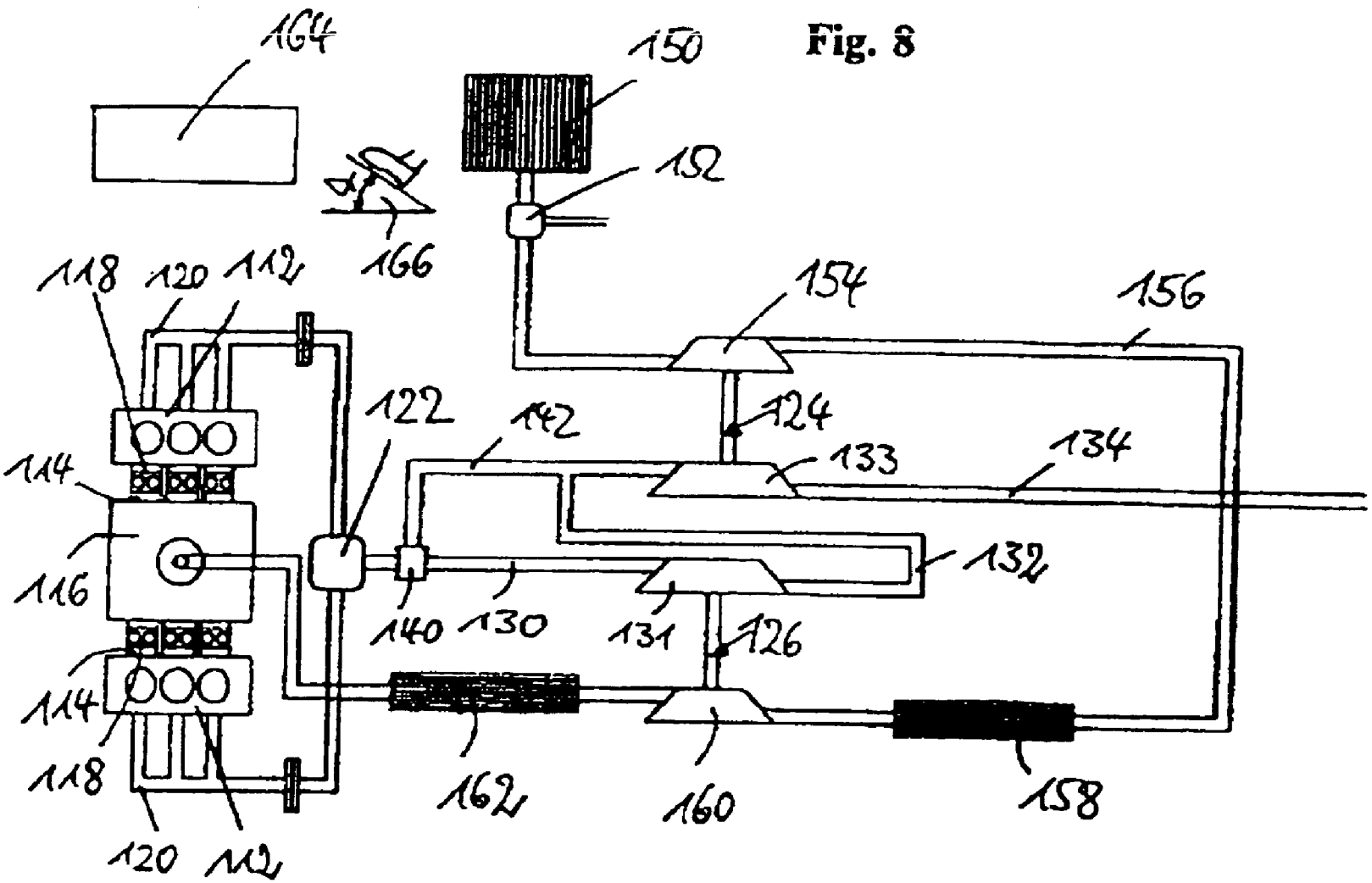

FIG. 8 shows a 6 cylinder motor provided with rotary disc valves for controlling the charging of the motor and having an additional register exhaust device.

The motor includes two cylinder banks 112 each having three cylinders which are connected via a suction conduit 114 with a mixture or air distributor 116.

In each of the suction conduits are disposed electrically actuable rotary disc valves 118 associated with the respective two intake valves per cylinder.

The exhaust gas piping 120 of all of the cylinders are collectively communicated with a collector 122 and the exhaust gas conducted therethrough is used for the driving of the two turbochargers 124 and 126.

A conduit 130 communicates the exhaust gas collector 122 with an exhaust gas turbine 131 of the turbo charger 126 and from there, a further conduit 132 communicates with an exhaust gas turbine 133 of a turbo charger 124 from which an exhaust gas conduit 134 leads to a muffler. An electrically actuable divider valve 140 is disposed in the conduit 130 such that a portion of the exhaust gas flow coming from the collector 122 is branched into a branch conduit 142 which is communicated with the exhaust gas turbine of the turbo charger 124.

The charging supply of the internal combustion engine occurs such that fresh air is drawn in through an air filter 150, the fresh air is mixed in a mixing unit 152 in a prescribed relationship, which can be determined in correspondence with the operational conditions of the internal combustion engine, the charge is thereafter compressed in the charging turbine 154 of the turbo charger 124, the compressed charge is conducted via a conduit 156 through a charge air cooler 158 and thereafter to the charging turbine 160 of the exhaust gas charger 126 and from there conducted through a further charger air cooler 162 to subsequently reach the air distributor 116.

An electronic control device 164 is provided to control the rotary disc valves 118 and the distribution valves 140 as well as the turbine blade positions in the event that the inlet of the exhaust gas turbine 131 and 133 of the turbo charger 124 and 126 are outfitted with variable turbine geometry. The electronic control device 164 has inputs for receiving input from sensors which sense the operational parameters of the internal combustion engine and the position of a gas pedal 116 and has outputs connected with the denominated electrically controllable components. The electrical connections as well as the sensors are not shown for the sake of simplicity.

The parameters for setting the rotary disc valves 118, tile distribution valves 140 as well as the inlet geometries of the turbo charger 124 and 126, if preset, as functions of the operational parameters of the internal combustion engine, are stored in the electronic control device 164 such that the opening and closing time points of the rotary disc valves 118 as well as those of exhaust gas volume directed to each exhaust gas turbine as well as the turbine geometries, if present, are optimally adjusted relative to one another, whereupon the required performance with the best possible efficiency of the internal combustion engine is produced.

Figure 9:
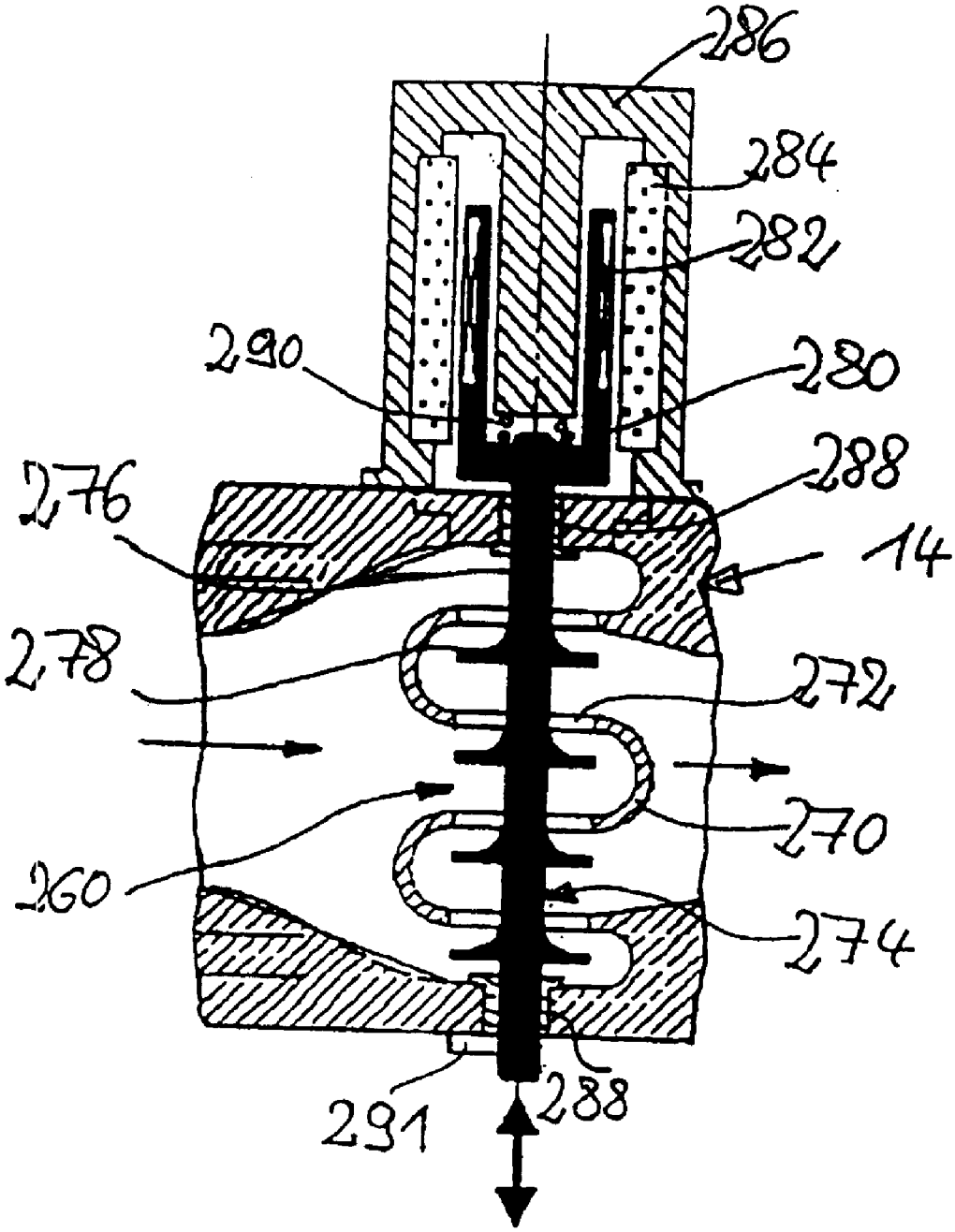

FIG. 9 shows a variation of the embodiment of the valve arranged in the suction conduit (FIG. 1).

As seen in FIG. 9, the suction conduit 14 has a meandering or serpentine separation wall 270 extending lengthwise of the conduit and includes four valve openings 272 each extending traverse to the suction conduit length. A valve member 274 extends transversely through the valve openings and includes a shaft 276 and a plurality of discs 278 fixedly disposed on the shaft. The arrangement in such that, in the open position of the valves shown in FIG. 9, the topmost and third topmost discs 278 are downstream of their respective associated valve openings 272 relative to the intake flow through the suction conduit and the two other discs 278 are upstream of their respective associated valve openings 272. The diameter of the discs 278 approximately corresponds to the diameter of the valve openings 272 such that the valve is closed if the shaft 276 together with the discs 278 is moved upwardly such that the discs 278 are located within the valve openings 272. The discs 278 are preferably formed in alignment with the flow.

The shaft 276 includes a cylindrical addition 280 outside of the suction conduit 14 operable to actuate the valves, the cylindrical addition 280 having a winding 282 encircled by a magnet 284 which is preferably an electromagnet and which is received in a housing 286 fixedly secured to the suction conduit 14.

The shaft 276 is longitudinally displaceably disposed within the suction conduit 14 in sockets 288. The cylindrical addition 280 is configured such that the stroke movement of the shaft 274 or, respectively, the valve member 274 is limited on the one hand by impact against the outside of the suction conduit 14 and limited on the other hand by impact against the projection of the housing 286.

A spring 290 biases the valve member 274 in its open position.

The function of the thus described valve is as follows:

The window 272 is connected to the control unit 26 (FIG. 1). The valve is normally open due to the biasing action of the spring 290. In connection with the energization of the winding 282 with corresponding electrical energy, the valve member is moved as seen in FIG. 9 upwardly into a position in which the discs 278 are disposed within the valve openings 272 and a through flow of fluid through the valve openings is blocked. As can be seen, there occurs in the closed position of the valve if, for example, an overpressure exists from the left of the valve, that this overpressure acts on the topmost and third topmost discs such that the valve member is biased downwardly, whereby, in contrast, the overpressure is exerted against the bottommost and third bottommost discs to bias the valve member upwardly, whereupon the valve member in totality is in force equilibrium independent of the pressure difference.

An advantage which is realized with the depicted valve is that it can be moved in an unusually rapid manner from the closed position into the open position and vice versa, whereby a precise control is possible with the least possible loss of flow.

In a preferred configuration, the shaft 276 is connected with a position sensor 291. This position sensor 291 delivers information concerning the exact instantaneous position of the shaft 276 or, respectively, the discs 278. The control unit 26 controls the energization through the winding 282 such that the real time position of the valve body (276, 278) corresponds at every time point of the movement sequence intervals to the prescribed positions programmed into the control unit. In this manner, it is ensured that the filling amount is the same per cylinder in multiple cylinder motors per unit control time.

It is to be understood that the electromagnetic actuation can be varied in different ways wherein, for example, the cylindrical addition 280 is configured as a magnetic anchor without its own winding. The illustrated embodiment (voice coil) has the advantage of much less magnetic attraction. The valve member can be altered together with the separation wall such that it opens or closes the valve openings by a 90° turn thereof.

The valve shown in FIG. 9 can be used instead of the valve of afore-described embodiments so that the functional advantages associated with the invention can also be achieved with this configuration. The closing time point of the valve is set increasingly ahead of the closing time point of the intake valve in dependence upon decreasing performance demands. The opening time point is accommodated independently of the closing time point to the rate of rotation of the motor in order to achieve the afore-described charging effect connected with reduced intake effort.

It is advantageous if the opening time point of the valve is varied, in connection with the same maintained closing time point or, respectively, the same maintained cylinder filling amount (air effort), so as to achieve as well the charging effect to optimize the charge transition in connection with partial loading.

The depicted effect can be characterized as a partial load resonance charge for minimizing the charge transition loss.

The specification incorporates by reference the disclosure of German priority document 198 30 575.3 of Jul. 8, 1998 and European Patent Application priority document PCT/EP99/04660 of Jul. 5, 1999.

The present invention is, of course, in no way restricted to the specific disclosure of the specification and drawings, but also encompasses any modifications within the scope of the appended claims.

I claim:

1. A charge control apparatus for a reciprocating internal combustion engine, the reciprocating internal combustion engine having at least one cylinder in which a piston is reciprocably moved by crankshaft, the cylinder having at least one intake conduit and an intake valve which opens and closes the intake conduit as a function of the rotation of the crankshaft and having at least one outlet conduit and an outlet valve which opens and closes the outlet conduit as a function of the rotation of the crankshaft, the charge control apparatus comprising:

a rotary disc valve disposed in the intake conduit upstream of the intake valve, the rotary disc valve having a rotatable member rotatably mounted in a housing and connected to an electric motor operable to move the rotatable member between a position in which the rotatable member closes the intake conduit and a position in which the rotatable member permits flow along the intake conduit to the intake valve; and a control unit for controlling the operation of the electric motor as a function of the engine performance demand indicated by an engine performance demand element to thereby effect movement of the rotatable member of the rotary disc valve such that the closing time point of the rotary disc valve at which the rotatable member closes flow through the intake conduit is set increasingly ahead of the closing time point of the intake valve as a function of decreasing engine performance demands.

2. A charge control device according to claim 1 and further comprising a torsion stiff and flexible connection coupling for interconnecting the rotatable member and the electric motor.

3. A charge control device according to claim 1 wherein the electric motor includes a magnetic pole rotor and the rotatable member and the electric motor are configured to operate with one another as an electromagnetic rotational unit.

4. A charge control device according to claim 1 wherein the electric motor which includes a magnetic field winding stator, and the housing together form an electromagnetic rotational unit.

5. A charge control device according to claim 1 wherein the cylinder includes two intake conduits each having a respective intake valve associated therewith, a rotary disc valve is disposed in each intake conduit, and each rotary disc valve is connected to a separate motor for independent actuation of the rotary disc valve.

6. A charge control apparatus for a reciprocating internal combustion engine, the reciprocating internal combustion engine having at least one cylinder in which a piston is reciprocably moved by a crankshaft, the cylinder having at least one intake conduit and an intake valve which opens and closes the intake conduit as a function of the rotation of the crankshaft and having at least on outlet conduit and an outlet valve which open and closes the outlet conduit as a function of the rotation of the crankshaft, the charge control apparatus comprising:

a separation wall extending lengthwise within the intake conduit and having a separate shape and a plurality of valve openings each extending transverse to the intake conduit length;

a shaft;

at least two closure members fixedly disposed on the shaft and each associated with a respective valve opening for opening and closing the respective valve opening in correspondence with movement of the shaft, one of the closure members being disposed on one side of the serpentine separation wall and this other closure member being disposed on the other side of the serpentine separation wall such that the pressure differential acting on the closure members in their closed positions is compensated;

a magnetic stroke actuator for moving the shaft longitudinally in one direction so as to effect closing of the valve openings in the serpentine separation wall by the respective closure members associated therewith and for moving the shaft longitudinally in an opposite direction so as to effect opening of the valve openings in the serpentine separation wall by movement of the closure members away from the valve openings; and a control unit for controlling the operation of the magnetic stroke actuator as a function of the negative performance demand indicated by an engine performance demand element to thereby effect movement of the closure members such that the closing time point of the valve openings at which the closure member close the valve openings is set increasingly ahead of the closing time point of the intake valve as a function of decreasing engine performance demands.

7. A charge control device according to claim 5 wherein there are four valve openings in the serpentine separation wall and four closure members are each associated with a respective valve opening.

8. A method for controlling the operation of a reciprocating internal combustion engine, the reciprocating internal combustion engine having at least one cylinder in which a piston is reciprocably moved by a crankshaft, the cylinder having at least one intake conduit by an intake valve which opens and closes the intake conduit as a function of the rotation of the crankshaft and having at least one outlet conduit and an outlet valve which opens and closes the outlet conduit as a function of the rotation of the crankshaft, an engine performance demand member whose position controls the amount of refresh air charge introduced through the intake conduit to the cylinder, and a charge control apparatus including a rotary disc valve disposed in the intake conduit upstream of the intake valve movable between a position in which the rotary disc valve closes the intake conduit and a position in which it permits flow along the intake conduit to the inlet valve, the method comprising:

controlling the opening of the rotary disc valve in the intake conduit to precede the opening of the intake valve such that, when the rotary disc valve is moved into its position in the intake conduit while the intake valve is still closed, a pressure wave produced by the vacuum existing between the rotary disc valve and the intake valve arrives, after reflection on the open end of the intake conduit, at the intake valve substantially contemporaneously with the opening of the intake valve, whereby the intake effort performed by the piston in drawing in a fresh charge into the cylinder is reduced.

9. A method for controlling the operation of a reciprocating internal combustion engine, the reciprocating internal combustion engine having at least one cylinder in which a piston is reciprocably moved by a crankshaft, the cylinder having at least one intake conduit and an intake valve which opens and closes the intake conduit as a function of the rotation of the crankshaft and having at least one outlet conduit and an outlet valve which opens and closes the outlet conduit as a function of the rotation of the crankshaft, an engine performance demand member whose position controls the amount of fresh air charge introduced through the intake conduit to the cylinder, a separation wall extending lengthwise within the intake conduit and having a serpentine shape and a plurality of valve openings each extending transverse to the intake conduit length, a shaft, at least two closure members fixedly disposed on the shaft and each associated with a respective valve opening for opening and closing the respective valve opening in correspondence with movement of the shaft, one of the closure members being disposed on one side of the serpentine separation wall and the other closure member being disposed on the other side of the serpentine separation wall such that the pressure differential acting on the closure members in their closed positions is compensated, and a magnetic stroke actuator for moving the shaft longitudinally in one direction so as to effect closing of the valve openings in the serpentine separation wall by the respective closure members associated therewith and for moving the shaft longitudinally in an opposite direction so as to effect opening of the valve openings in the serpentine separation wall by movement of the closure members away from the valve openings, the method comprising:

controlling the movement of the closure members to effect opening their associated valve openings in the serpentine separation wall in the intake conduit to precede the opening of the intake valve such that, when the valve openings in the serpentine separation wall in the intake conduit are open while the intake valve is still closed, a pressure wave produced by the vacuum existing between the valve openings in the serpentine separation wall in the intake conduit and the intake valve arrives, after reflection upon the open end of the intake conduit, at the intake valve substantially contemporaneously with the opening of the intake valve, whereby the intake effort performed by the piston in drawing in a fresh charge into the cylinder is reduced.

10. A method according to claim 8 and further comprising controlling the movement of the rotary disc valve as a function of a selected one of the charging volume and the charging pressure of a charging apparatus.

11. A method according to claim 8 wherein the reciprocating internal combustion engine includes a series of exhaust gas turbo charges and an exhaust gas distribution valve is controlled to effect the immediate impact of exhaust gas on the exhaust gas turbo chargers as a function of the control of the rotary disc valve.

12. A method according to claim 11 wherein each exhaust gas turbo charge includes a variable intake geometry which is controlled as a function of the content of the rotary disc valve.

13. A method according to claim 9 and further comprising controlling the movement of the closure member to open and close the valve openings in the serpentine separation wall in the intake conduit as a function of a selected one of the charging volume and the charging pressure of a charging apparatus.

14. A method according to claim 13 wherein the reciprocating internal combustion engine includes an exhaust gas turbo charger and an exhaust gas valve is controlled to effect the immediate impact of exhaust gas on the exhaust gas turbo charger as a function of the control of the closure members.

15. A method according to claim 14 wherein the exhaust gas turbo charger includes a variable intake geometry which is controlled as a function of the control of the closure members.

*16. A method for controlling operation of an internal combustion engine,*

*wherein the internal combustion engine comprises:*

*at least one cylinder,*

*a piston reciprocally movable in the at least one cylinder,*

*at least one intake conduit in communication with the cylinder,*

*an intake valve arranged and constructed to open and close the intake conduit as a function of crankshaft rotation,*

*means for generating signals representative of engine performance demands, and*

*a charge control valve movably disposed in the at least one intake conduit upstream of the intake valve, the charge control valve being arranged and constructed to open and close the intake conduit based upon the signals from the means for generating signals representative of engine performance demands,*

*the method comprising:*

*closing the charge control valve increasingly ahead of closing the intake valve in response to signals indicating decreasing engine performance demands, whereby a reduced pressure condition is generated between the charge control valve and the intake valve; and*

*opening the charge control valve ahead of opening the intake valve, such that the charge control valve is opened, while the intake valve is still closed, at a timing to generate a pressure wave by the reduced pressure condition between the charge control valve and the intake valve, which pressure wave is reflected by an open end of the intake conduit, and such that the pressure wave arrives at the intake valve substantially contemporaneously with the opening of the intake valve.*

*17. A method as in claim 16, wherein the internal combustion engine further comprises means for increasing an amount of fresh charge supplied via the intake conduit to the cylinder, the method further comprising opening and closing the charge control valve based, at least in part, upon one of charging volume and charging pressure.*

*18. A method as in claim 16, wherein the internal combustion engine further comprises:*

*at least first and second exhaust gas turbo charges, each comprising an exhaust turbine connected in series with a charger turbine and*

*a divider valve disposed upstream of the first exhaust turbine,*

*the method further comprising selectively directing exhaust gas directly to the charger turbine in dependence upon operational parameters of the internal combustion engine.*

*19. A method as in claim 18, wherein each exhaust gas turbine comprises a variable intake geometry and the method further comprises controlling the variable intake geometry as a function of the operational parameters of the internal combustion engine.*

*20. A method as in claim 16, wherein the internal combustion engine further comprises an electric step motor receiving the signals from the means for generating signals representative of engine performance demand and being arranged and constructed to control the opening and closing of the charge control valve based upon said signals.*

*21. A method as in claim 20, wherein the charge control valve comprises a rotary valve.*

*22. A method as in claim 21, wherein the rotary valve and the electric step motor are interconnected by a torsion-stiff, but flexible bending connection.*

*23. A method as in claim 16, wherein the change control valve comprises a linearly movable valve.*

*24. An apparatus suitable for controlling operation of an internal combustion engine, wherein the internal combustion engine comprises:*

*at least one cylinder having at least one intake opening and at least one exhaust opening,*

*a piston reciprocally movable in the at least one cylinder,*

*an intake valve arranged and constructed to open and close the intake opening as a function of crankshaft rotation,*

*means for generating signals representative of engine performance demands,*

*wherein the claimed apparatus comprises:*

*at least one intake conduit in communication with the at least one intake opening,*

*a change control valve movably disposed in the at least one intake conduit upstream of the intake valve,*

*a motor being arranged and constructed to open and close the charge control valve, and*

*a controller arranged and constructed to receive the signals from the means for generating signals representative of engine performance demands and being arranged and constructed to supply charge control valve signals to the motor, such that:*

*the charge control valve is closed increasingly ahead of closing of the intake valve in response to signals indicating decreasing engine performance demands, whereby a reduced pressure condition is generated between the charge control valve and the intake valve, and*

*the charge control valve is opened ahead of opening of the intake valve, such that the charge control valve is opened, while the intake valve is still closed, at a timing to generate a pressure wave by the reduced pressure condition between the charge control valve and the intake valve, which pressure wave is reflected by an open end of the intake conduit, and such that the pressure wave arrives at the intake valve substantially contemporaneously with the opening of the intake valve.*

*25. An apparatus as in claim 24, wherein the internal combustion engine further comprises means for increasing an amount of fresh charge supplied via the intake conduit to the cylinder, wherein the controller is further arranged and constructed to open and close the charge control valve based, at least in part, upon one of charging volume and charging pressure.*

*26. An apparatus as in claim 24 wherein the internal combustion engine further comprises:*

*at least first and second exhaust gas turbo chargers, each comprising an exhaust turbine connected in series with a charger turbine, and*

*a divider valve disposed upstream of the first exhaust turbine, wherein the divider valve is arranged and constructed to selectively direct exhaust gas directly to the charger turbines in dependence upon operational parameters of the internal combustion engine.*

*27. An apparatus as in claim 26, wherein each exhaust gas turbine comprises a variable intake geometry arranged and constructed to be controlled as a function of the operational parameters of the internal combustion engine.*

*28. An apparatus in claim 24, wherein the motor is an electric step motor.*

*29. An apparatus as in claim 28, wherein the charge control valve comprises a rotary valve.*

*30. An apparatus as in claim 29, wherein the rotary valve and the electric step motor are interconnected by a torsion-stiff, but flexible bending connection.*

*31. An apparatus as in claim 24, wherein the charge control valve comprises a linearly movable valve.*

* * * * *